Figure 2:
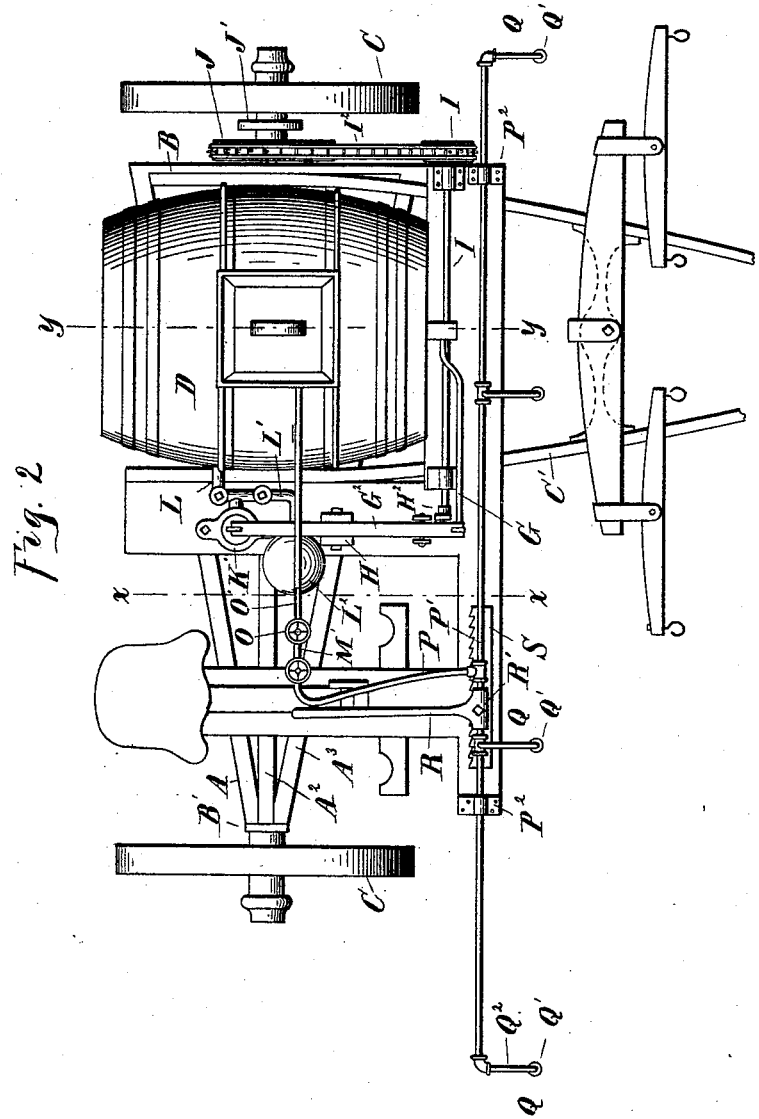

(No Model.) 3 Sheets—Sheet 1.
M. J. CASWELL.
DISTRIBUTING LIQUID POISON.
No. 453,406. Patented June 2, 1891.
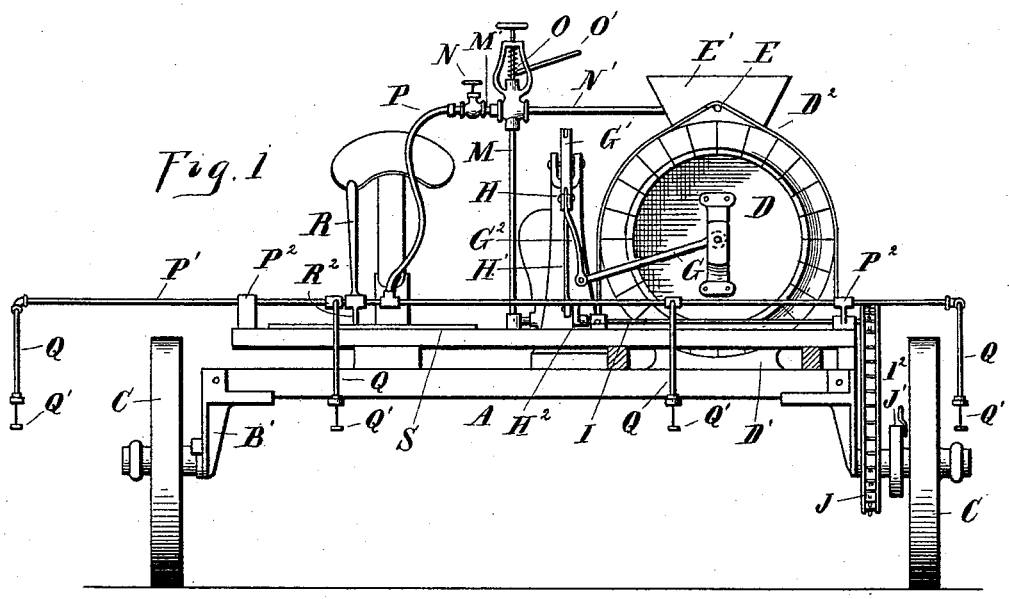
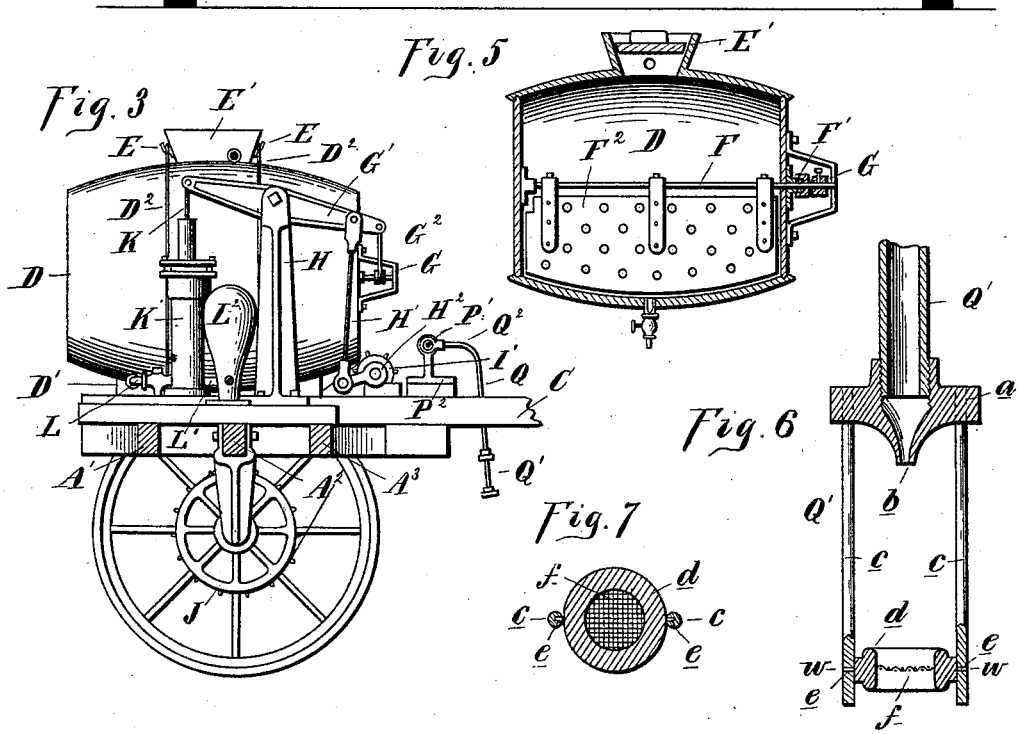
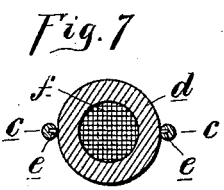
Witnesses:
P. M. Hulbert
M. B. Dougherty
Inventor:
Myron J. Caswell
By Thos. J. Maguire & Son
Atty.

(No Model.) 3 Sheets—Sheet 2.
M. J. CASWELL.
DISTRIBUTING LIQUID POISON.

No. 453,406. Patented June 2, 1891.

Witnesses:
P. M. Hulbut
J. M. O.Dogherty

Inventor:
Myron J. Caswell
By Thos. J. Maguire &Son,
Atty.

(No Model.) 3 Sheets—Sheet 3.
M. J. CASWELL.
DISTRIBUTING LIQUID POISON.
No. 453,406. Patented June 2, 1891.
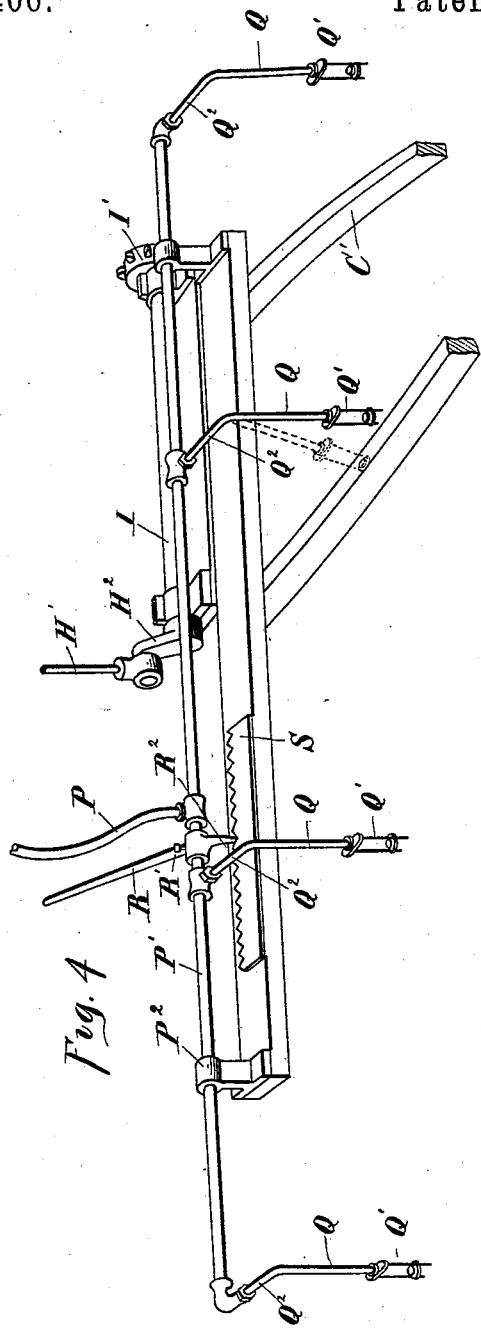
Witnesses:
P. M. Hulbert
M. B. O'Dogherty
Inventor:
Myron J. Caswell
By Thos. J. Magne & Son,
Atty.

UNITED STATES PATENT OFFICE.

MYRON J. CASWELL, OF CASTALIA, OHIO.

DISTRIBUTING LIQUID POISON.

SPECIFICATION forming part of Letters Patent No. 453,406, dated June 2, 1891.

Application filed September 9, 1890. Serial No. 364,479. (No model.)

*To all whom it may concern:*

Be it known that I, MYRON J. CASWELL, a citizen of the United States, residing at Castalia, in the county of Erie and State of Ohio, have invented certain new and useful Improvements in Devices for Distributing Liquid Poison, of which the following is a specification, reference being had therein to the accompanying drawings.

This invention relates to new and useful improvements in devices for distributing liquid poison; and the invention consists in the peculiar construction of the supporting-frame carrying a tank, the stirring mechanism, and the distributing mechanism, all as more fully hereinafter described.

In the accompanying drawings, Figure 1 is a front elevation of my improved device. Fig. 2 is a plan view thereof. Fig. 3 is a vertical cross-section on line $x$ $x$ in Fig. 2. Fig. 4 is a detached perspective view of the shifting sprinkler-tube. Fig. 5 is a vertical cross-section on line $y$ $y$ in Fig. 2. Fig. 6 is a vertical section through one of the sprinkling-nozzles. Fig. 7 is a cross-section thereof on line $w$ $w$.

A is the supporting-frame, consisting of the longitudinal bars $A'$ $A''$ $A^3$, connected at one end by the cross-bar B and at the other end connected into the bracket $B'$, supported upon the stub-axle of one ground-wheel C, the other end of the frame being supported upon a similar bracket. These brackets support the frame a sufficient distance above the ground to clear all vines over which the device is driven.

To the frame are secured suitable draft devices, such as shafts $C'$.

D is a tank, preferably in the form of a barrel, secured upon the saddles $D'$ upon the frame by means of the straps $D''$ engaging with suitable hooks E upon the hopper $E'$ of the barrel. The hopper has a tight-fitting cover with any suitable means for securing it in position.

F is a shaft located centrally within the barrel and carrying the depending perforated stirrer-paddle $F''$. This shaft has one end projecting through a stuffing-box $F'$ to the exterior, an arm G being secured to this extension and extending to the side of the barrel. This arm is connected to an extension of the walking-beam $G'$ by a connecting-rod $G''$, the walking-beam being supported on a suitable standard H. The walking-beam is connected by the rod $H'$ with the crank $H''$ upon the shaft I, which at its end carries a sprocket-wheel $I'$, to which power is transmitted by a sprocket-chain $I''$ from a sprocket-wheel J upon one of the stub-axles.

$J'$ is any suitable clutch for making and breaking connection between the axle and the sprocket-wheel. The other end of the walking-beam is connected by the piston-rod K to the pump $K'$, which has an induction-pipe L and eduction-pipe $L'$ connecting with bottom of barrel.

The eduction-pipe has a suitable air-chamber $L''$, beyond which it is provided with the stand-pipe M, extending to the top of the barrel. From the top of this stand-pipe extends the supply-pipe $M'$ on one side, controlled by the valve N and the return-pipe $N'$, which enters the top of the tank. The pipe $N'$ is normally closed by means of a spring-actuated valve O, which is provided with a suitable hand-lever $O'$, whereby it may be opened by the operator, if desired.

The supply-pipe $M'$ is provided with a flexible connection P, which connects at the forward end of the machine with the sprinkler-tube $P'$, which is slidingly supported in suitable brackets $P''$. This tube is provided with a series of sprinkler-pipes Q, which at their lower ends are provided with sprinkling-nozzles $Q'$ of a construction hereinafter more fully described. The sprinkler-tubes Q engage with the tube $P'$ by means of a screw-thread on the horizontal portion $Q^2$ thereof engaging with suitable screw-threaded apertures in the tube. The tube is adjusted in its sliding bearing by means of the hand-lever R, which is adjustably secured to the tubes by means of the set-screw $R'$, and is provided at its lower end with a finger $R''$, engaging with the notched bar S. When the tube has been adjusted to its proper position, so that the nozzles $Q'$ are directly over the rows and vines to be sprinkled, the finger $R'$, engaging in the notched bar S, holds it in its adjusted position.

To adjust the height of the nozzles in relation to the ground, I loosen the set-screw $R'$ and adjust the hand-lever R upon the tube in such relation to the nozzles that they will be supported at the proper distance. It will thus be seen that the nozzles may be adjusted laterally by adjusting the tube and vertically by adjusting the hand-lever. Should it happen that any two rows of vines were nearer together or farther apart than the others, each nozzle may be adjusted to and from the other by turning it in its screw-threaded bearing, so that it will set at an angle to the supply-tube, as shown in dotted lines in Fig. 4.

Each nozzle is of the same construction, which is as follows: $a$ is a head having formed thereon the jet $b$. Upon either side of the jet are secured two downwardly-extending spring-arms $c$ upon opposite sides, between the lower end of which is secured a ring $d$, having pin $e$, by means of which the ring has a pivotal engagement with the arm $c$. Within the ring a screen $f$ is secured. The spring-arms $c$ are suitably notched to engage with the side of the ring, whereby it will be held in its adjusted position. It is evident that the screen may be reversed, so that if one side should be filled with sediment by turning it over the liquid falling from above will clean out the sediment and the device be again operative. The parts being thus constructed, when the clutch J' connects the stub-axle with the sprocket-wheel J motion will be transmitted by the sprocket-chain I'' through the crank-shaft I to the walking-beam, from which motion is communicated to the stirrer-blade within the tank, preventing the sediment from accumulating in the bottom of the tank, and also to the pump, which draws the liquid from the bottom of the tank and discharges it through the sprinkler-tube.

The operator may guide the nozzles on the sprinkler-tube so that they may rest over the rows or vines through which they are driven, adjusting them also the proper height by raising or lowering the hand-lever. The fluid coming out through the pipes Q' will be deposited in a fine stream from the nozzle $b$ and will be sprayed upon striking the ring $d$ and screen $f$ so as to fall in a shower directly upon the vines, being broken into a fine spray.

What I claim as my invention is—

1. In an apparatus of the kind described, the combination, with the frame, of a tank on the frame, a pump, means for actuating the same, a connection between the pump and lower part of the tank, a stand-pipe, a valved connection between the same and top of the tank, a flexible tube leading from the pipe, a horizontal sliding tube on the frame into which the flexible tube enters, lateral screw-threaded nipples on the horizontal tube, angular nozzles adjustably secured in said nipples, and sprayers on the nozzles, substantially as described.

2. In apparatus of the kind described, the combination, with the frame, of a tank mounted thereon, a straight horizontal sliding tube secured on the frame, a flexible connection between the same and tank, and angular nozzles adjustably secured in the horizontal tube carrying sprayers at their ends, substantially as described.

3. In an apparatus of the kind described, spraying-nozzles consisting of a jet, parallel arms extending below the same, and a pivoted perforated disk between the lower ends of the arms, substantially as described.

4. In an apparatus of the kind described, a jet, two arms extending below the same, and a reversible perforated disk pivoted on the lower ends of the arms, substantially as described.

5. In an apparatus of the kind described, a jet, spring-arms extending below the same, and a perforated disk pivoted on the lower ends of the arms, substantially as described.

6. In a device of the kind described, the combination, with a jet secured to the supply-tube, of the depending spring-arm $c$, the ring $d$, clamped between the lower ends of said arms, and the screen $f$ within said ring, substantially as described.

7. In a device of the kind described, the combination, with the supply-tube, of the head $a$, the nozzle $b$, the spring-arm $c$, the ring $d$, having pins $e$, pivoted in the lower end of said arms, and the screen $f$ within said ring, substantially as described.

8. In a device of the kind described, the combination, with the tank, pump, and flexible connecting-pipe, of the sliding tube P', engaging in suitable bearings and carrying a series of depending nozzles, of the hand-lever R, adjustably secured to said tube, the finger R'', and a notched bar S, substantially as described.

In testimony whereof I affix my signature in presence of two witnesses.

MYRON J. CASWELL.

Witnesses:
JOHN GALLAGHER,
HARRIET E. CASWELL.